Sept. 24, 1935.  S. A. STAEGE ET AL  2,015,539
REGULATING SYSTEM
Filed Nov. 25, 1933
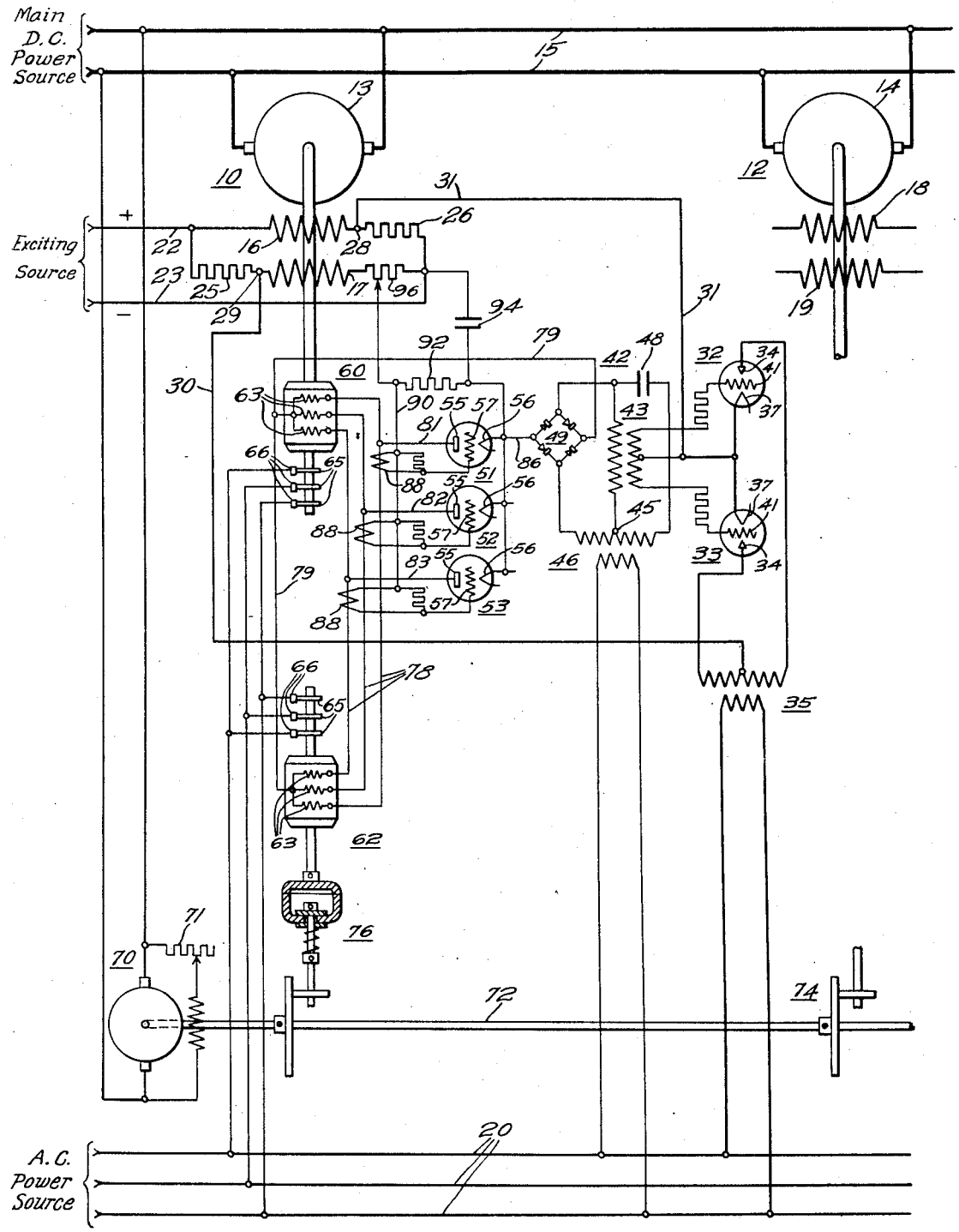
WITNESSES:
INVENTORS.
John F. Peters,
Henry W. Reding &
Stephen A. Staege.
BY
Franklin E. Hardy
ATTORNEY Patented Sept. 24, 1935

2,015,539

UNITED STATES PATENT OFFICE 2,015,539

REGULATING SYSTEM

Stephen A. Staege, Pittsburgh, Henry W. Reding, Forest Hills, and John F. Peters, Edgewood, Pa., assignors to Westinghouse Electric & Manufacturing Company, East Pittsburgh, Pa., a corporation of Pennsylvania Application November 25, 1933, Serial No. 699,750

8 Claims. (Cl. 172—293)

Our invention relates to regulating systems and it has particular relation to systems adapted to maintain the speeds of a plurality of rotating machines in a predetermined relationship.

In certain applications where a plurality of separate driving motors are employed to propel different parts of a unitary machine, such, for example, as in paper making machines, steel rolling mills, and other machines comprising individually driven sections, it is essential that the speeds of the several section driving motors be maintained in predetermined relation. In such regulating systems, a satisfactory practice is to compare the speed of each of the motors to be regulated with that of a master machine which rotates at a constant or desired rate, this comparison being made in such manner that variations from the desired relation will act to initiate speed-corrective adjustments.

In a copending application, Serial No. 691,159, filed September 27, 1933, by S. A. Staege, there is shown and described a regulating system, especially adapted for service of the above-mentioned type, which system causes each of the regulated motors to rotate at a speed that is in synchronous relation with an alternating-current speed-setting machine or master circuit. In that system, each of the regulated motors, which for the majority of applications of this kind are of the direct-current type, is provided with electronic-tube or other equivalent speed-adjusting means sensitive to changes in the phase position between an alternating-current pilot voltage, having a frequency proportional to the motor speed, and a master voltage, the frequency of which is proportional to the desired speed of the motor.

As pointed out in that application, this system of regulation eliminates mechanical inertia and moving contact devices and hence is exceedingly sensitive and free from the usual difficulties peculiar to mechanically moving parts. Our invention is directed to improvements in this basic system of speed regulation and in addition it contemplates further advantageous features which are applicable to other types of regulating systems for the above-considered and comparable applications.

One object of our invention is to provide an improved form of regulating system in which the speed of each of the regulated machines is determined by the frequency of the output voltage of a master or speed-setting machine.

Another object of our invention is to provide a regulating system of the speed-matching type which permits the use of means whereby the pilot and master alternating-current generators employed may be prevented from being pulled out of step.

A further object of our invention is to provide a regulating system of the type described which will automatically bring the regulated motors up to the desired speeds during the starting operations.

A still further object of our invention is to provide satisfactory anti-hunting means in a speed-regulating system of the type under consideration.

An additional object of our invention is to provide an excitation supply system for each of the direct-current motors to be regulated which reduces the amount of current that must be supplied through the speed control equipment.

A still further object of our invention is to provide an excitation supply system for the regulated motors which acts to reduce the motor speed in the event of failure of the speed control equipment.

Our invention itself, together with additional objects and advantages will best be understood from the following description of a specific embodiment thereof when taken in conjunction with the accompanying drawing, in which The single figure is a diagrammatic representation of apparatus and circuits comprised by a preferred form of the regulating system of our invention shown as being applied to control the speeds of a plurality of direct-current motors.

Referring to the drawing, two of the plurality of direct current motors whose speeds are to be regulated are illustrated at 10 and 12. The motors respectively comprise armature windings 13 and 14 which are suitably connected for energization from a source of direct current power, illustrated as circuit conductors 15, and field windings 16—17 and 18—19 which derive the controllable portion of their energization from rectified current supplied from an alternating current power source indicated as the conductors 20.

In order to reduce the magnitude of exciting current which must be supplied through the speed-control equipment of the regulating system about to be described, we provide each of the regulated motors with at least two field windings which derive the major portion of their energization from a suitable source of constant-potential direct-current power such as an exciting generator or the like. As shown in the drawing, in the case of motor 10 a circuit identified by conductors 22 and 23 constitutes this source and supplies current to diagonally opposite points of a quadrangle comprising as opposite sides, the two field windings 16 and 17 and two resistors 25 and 26. These resistors are designed to pass sufficient energizing current to the two windings, that are cumulatively related, to excite the regulated motor to a degree corresponding to a speed somewhat below the lower limit of its regulating range.

Connected with the remaining diagonal points 28 and 29 in the field winding and resistor interconnection are conductors 30 and 31 comprising the output circuit of the speed-control equipment to be further described presently, which equipment acts to change the motor excitation to effect speed adjustments.

Assuming that, as illustrated, the constant voltage or major source energizing conductor 22 is of positive polarity with respect to conductor 23 and that the speed adjusting energizing source conductor 31 is positive with respect to conductor 30, the current entering at point 28, in following the two parallel paths available to it to reach the diagonally opposite point 29 in the interconnection, will tend to flow through both of windings 16 and 17 in a direction from right to left which being opposite to the direction of major energizing current flow from source 22—23, which is from left to right through both windings, reduces the magnitude of this major current, and thereby effects the desired changes in motor excitation. The advantage of this particular arrangement is the reduction of capacity of the speed adjusting equipment required to effect given adjustments in excitation and an insurance that failure of the speed-control equipment will prevent an increase in motor speed.

Although in the particular connection shown, the excitation adjustment utilized to provide speed control is effected by neutralizing a portion of the major energizing current supplied to the motor field windings 16 and 17 from the direct current source 22—23, it will be understood that other ways of effecting speed control may be used instead, in conjunction with the remaining portions of the system of our invention. For example, the regulated motor may be provided with but a single field winding which derives its entire energization through the speed control equipment, or the motor field winding may be supplied with a current of constant strength and the armature winding current varied by the speed-control equipment.

In the system of the copending application before referred to, each of the regulated motors drives an alternating-current generator which produces a pilot voltage, of a frequency proportional to the actual speed of the motor, which is compared with the frequency of the voltage of a master alternating-current generator, the frequency of which is proportional to the desired speed of the motor. Changes in the phase position between the two voltages control suitable speed-adjusting means associated with the motor in such manner that the pilot voltage will be maintained in synchronism with the master voltage.

Whereas in the system disclosed in that application, there is nothing to restrain the pilot and master generators from being pulled out of synchronism in the event that the regulated motor speed variations are unduly large, the present invention contemplates modification or improvements which overcome this disadvantage. Thus, instead of adding together the voltages of the pilot and master machines to produce the required control potential for the speed-adjusting means, we contemplate a direct interconnection of the output circuits of the two machines through which interconnection there will circulate a synchronizing current the direction or phase position of which, with respect to the generator voltages, depends upon whether the pilot voltage lags or leads the master voltage in phase position and the magnitude of which current is determined by the magnitude of the phase displacement. This current is then utilized to control electronic-tube or other equivalent speed-adjusting means for the regulated motor in such manner that the pilot generator will be driven at a speed that is synchronous with that of the master generator.

As the displacement between the two machine voltages increases, the torque which their driving shafts must transmit to circulate the resulting synchronizing current, rises rapidly so that there is created a mechanical effort tending to prevent the machines from falling out of step. By placing in the driving connection of one of the machines a clutch device the torque transmitting capacity of which is less than that required to pull the two generators out of step, we provide means for effectively preventing loss of synchronism between the pilot and master generators when the speed of the regulated motor deviates from the desired value by an excessive amount.

Thus, in the system illustrated, the speed of each of the regulated motors is compared, through the utilization of a pilot alternating-current generator, with that of a master alternating-current generator that is driven at a rate corresponding with, or definitely related to, the desired speed of the regulated motor. In the case of the motor 10, this pilot generator, which is driven at a speed fixedly related to that of the motor, is illustrated at 60 while the master generator, which sets the speed at which the motor will be maintained, is illustrated at 62. While as shown, machines 60 and 62 are in the form of induction generators which in mechanical construction may be similar to wound-rotor induction motors, it will be understood that they may also be of the well-known synchronous or direct-current excited type. As illustrated, each of the generators comprises three-phase armature windings 63 and three-phase rotor windings (not shown) the connections of which are brought out to slip rings 65. The machine rotor windings are shown as being excited from the three-phase power source 20 by means of direct connections therewith established through brushes 66.

The generators 60 and 62 are driven at speeds which are somewhat different from the synchronous values determined by the frequency of the exciting source 20, in order that there may be induced in the stator windings 63 voltages of a frequency suitable for the regulating service. Each of the additional direct-current motors to be regulated is provided with a pilot generator, comparable to machine 60 shown in association with the motor 10, which cooperates with a master generator, comparable to machine 62, to control the motor speed-adjusting equipment that is provided for each of these additional motors and which is similar to that shown in association with the motor 10.

The master generators are driven at predeterminedly related speeds by any suitable means, illustrated in the drawing in the form of a direct-current motor 70 which is of an adjustable speed type. As shown, this motor is energized from the direct-current power source 15 and is provided with a speed-changing rheostat 71. The motor drives, by means of a shaft 72, the master generators through speed changing mechanism 74 which may be of any one of a number of well known types.

A slip-clutch device is connected between each of the master generators and its driving means, shown at 76 for the generator 62. While this device is illustrated as of a mechanical or friction drive type, it will be understood that electromagnetic and other equivalent types of devices may instead be utilized to prevent the pilot and master generators from being pulled out of step.

The output or stator windings 63 of pilot and master generators 60 and 62 are directly connected by means of circuit conductors 78, a conductor 79 also being utilized to tie together the neutral points of these star-connected stator windings. When the output voltages of the generators have a complete in-phase relation with each other, the current flowing in conductors 78 is zero and the synchronizing torque is also zero. However, as departure from this "in-phase" relation is made, a synchronizing or power-interchanging current is caused to circulate through circuit 78, the magnitude of which is a function of the phase displacement. This current sets up, as before explained, the synchronizing torque which appears as mechanical turning effort that must be transmitted by the generator driving shafts. Hence by restricting the torque-transmitting capacity of the slip clutch device 76 to a value below that required to pull the two generators out of synchronism, the machines may at all times remain in step.

Considering now the speed-adjusting apparatus illustrated in association with motor 10, this equipment comprises a pair of electronic tubes or other equivalent devices, such as mercury-pool cathode rectifiers provided with make-alive elements that must be excited to institute conduction during each positive half cycle of anode voltage, and which act as control means for the rectifying current delivered from the alternating-current power source 20. In the case of the motor 10, these devices are shown at 32 and 33 as having anode elements 34 connected to opposite ends of the secondary winding of a transformer 35, the primary winding of which transformer is directly connected to supply conductors 20. The cathode elements 37 of the devices are joined together and connected through conductor 31 to point 28 in the motor field winding interconnection, the diagonally opposite point 29 of which interconnection is joined by means of conductor 30 to the mid tap of the secondary winding of transformer 35.

Devices 32 and 33 are illustrated as grid controlled gas filled tubes each of which is capable of conducting current only from the anode to the cathode element. Thus, in the connection shown, tube 32 will pass current during alternating half cycles of the voltage acting in transformer 35, while tube 33 will similarly pass current during the remaining half cycles, full-wave rectification thus being effected by the apparatus.

The effective value of this rectified current supplied to the motor windings through the tubes is controlled by changing the characteristics of the potential impressed upon the tube grid elements 41. If this potential is an alternating-current voltage having a frequency equal to that of the power source voltage impressed upon the tube anode elements, changes in phase displacement will effect, through a wide range, an adjustment of the effective conductivity of the tube. Thus, when this displacement is slight, conduction will be instituted at an early point in each positive half cycle and continuing as it does during the remainder of that half cycle, the effective current passed by the tube will be maximum. However, as the displacement of the grid voltage with respect to the tube anode voltage is made to approach 180°, the conduction starting point is progressively delayed with a resulting decrease in effective tube conductivity.

The grid control potential for the tubes is supplied from a phase shifting bridge circuit 42 which comprises a grid influencing transformer 43 connected between the mid point 45 of the secondary winding of a transformer 46 and a conductor joining a capacitor 48 with a full wave rectifier 49. The capacitor and rectifier of the bridge circuit are connected in series for energization from the transformer 46, the primary winding of which transformer is energized from the alternating-current circuit 20. The amount of phase shift between the voltage of transformer 43 of the bridge circuit and that of the supply circuit 20 is controlled by varying the effective resistance of the rectifier 49, which variation, in the system of our invention, is effected by electronic tubes 51, 52 and 53.

In order that the circulating current which flows in the generator interconnecting circuit 78 may act to adjust the effective resistance of full-wave rectifier 49 of the phase-shifting bridge circuit 42, these electronic tubes 51, 52 and 53, which are preferably of the continuous control or vacuum type, are connected in the output circuit of the rectifier and controlled by this circulating current. In the particular arrangement shown, the positive terminal of the rectifier is connected through conductor 79 with the neutral points of the stator windings of the two generators 60 and 62. With the conductors 78 which join together the other ends of the stator windings of the two generators are connected, by means of conductors 81, 82 and 83, respectively, the anode elements 55 of the three tubes, the cathode elements 56 of which are joined together and connected, by means of a conductor 86, with the negative terminal of rectifier 49.

Since each of the tubes 51, 52 and 53 conducts current only when the anode element is positive with respect to the cathode element, and since each tube is acted upon by a potential made up of the voltage of one of the phases of the alternating-current generators superimposed upon the uni-directional output voltage of the rectifier, the return circuit for the current leaving the rectifier 49 through the conductor 79 will progressively shift from one to another of the three tubes as the generator phase winding voltages progressively advance through their cycles of values to make the tube anodes positive with respect to the cathodes. At all times, however, at least one of the three tubes will have a positive anode potential and will thus serve to conduct the rectifier current, and if the rectifier output voltage exceeds the maximum instantaneous value of generator voltage wave all of the tubes may be maintained conductive.

Consequently, by adjusting the impedance which the electronic tubes 51, 52 and 53 present to the flow of current during their positive half cycles of anode voltage, the effective resistance of rectifier 49 may be changed in the manner required. To effect this adjustment, the grid element 57 of each of the tubes is connected to be acted upon by the voltage produced in an associated current transformer 88 placed in one of the generator interconnecting conductors 78. The windings of these three transformers are star-connected, one side of each being tied to a common or neutral conductor 90 which, through a resistor 92, is joined with the cathode elements 56 of the three tubes, while the other side of each of the transformers is connected with the grid element 57 of the tube associated with that phase of the generator interconnecting circuit 78.

The nature of this connection is such that when the voltage of the pilot generator 60 lags the voltage of master generator 62, as is the case when the speed of regulated motor 10 starts to deviate below the desired value, each of the current transformers 88 imparts to the associated tube a positive grid bias during the positive half cycle of tube anode voltage. Likewise, when the voltage of the pilot generator leads that of the master generator, as is the case when the speed of the regulated motor deviates above the desired value, the current transformer associated with each tube imparts to it a negative grid bias during the positive half cycle of the anode voltage.

Such changes in grid bias, of course, produce corresponding changes in the tube impedance and by similarly affecting adjustments in the resistance of rectifier 49 control the conductivity of speed adjusting tubes 32 and 33 in a manner appropriate to correct the speed deviation of the regulated motor.

Thus in operation of the complete regulating equipment which has just been described in association with motor 10, when the motor is operating at the desired speed, the voltage of pilot generator 60 is substantially in phase with that of master generator 62 and the current which circulates through the conductors of interconnecting circuit 78 is substantially zero. The resulting zero or intermediate grid bias applied by transformers 88 to electronic tubes 51, 52 and 53 maintains their impedances at intermediate values which impart to rectifier 49 the effective resistance corresponding to the desired-speed adjustment of the excitation of motor 10.

Upon the occasion of a decrease in the speed of motor 10, the resulting slowing down of the pilot generator 60 causes its voltage to lag that of the speed setting or master generator 62 and thereby sets up in circuit 78 between the two generators a circulating or power interchanging current. Relative to the generator voltage, the phase position of this current is, as before pointed out, such that the current transformers 88 impart to tubes 51, 52 and 53 a positive grid bias during the positive half cycles of tube anode voltage. This raises the tube conductivity and by thus lowering the effective resistance of rectifier 49 lowers the displacement angle of the voltage which bridge circuit 42 applies to the grid elements of speed control tubes 32 and 33. The resulting increase in current passed by these tubes acts to lower, in the particular connection of motor field windings shown, the excitation of motor 10 which causes it to increase its speed back to the desired value.

In a similar manner, upon an increase in the speed of motor 10, the voltage of pilot generator 60 tends to lead that of master generator 62 and thus sets up in interconnecting circuit 78 a circulating or power-interchanging current of reversed phase relation, which causes transformer 88 to impart to tubes 51, 52 and 53 a negative grid bias during the positive half cycles of tube anode voltage. The decreased tube conductivity which results raises the resistance of rectifier 49 and, by lowering the current passed by speed control tubes 32 and 33, raises the excitation of motor 10 to lower the motor speed back to the desired value.

In order to improve the stability of the regulating system, anti-hunting means may, if desired or found necessary, be combined therewith. As shown in association with motor 10, these means comprise the before mentioned resistor 92 disposed in the grid energizing circuits of vacuum tubes 51, 52 and 53, which resistor is connected in series with a capacitor 94 for energization by the voltage appearing across a portion of a resistor 96 connected in series with one of the field windings of the regulated motor. This particular arrangement is comparable to that shown and described in a copending application, Serial No. 543,514 by J. H. Ashbaugh and F. H. Gulliksen, filed June 11, 1931. In operation, a change in the energizing current of the motor field winding 17, and hence the voltage appearing across resistor 96, causes the capacitor 94 to draw a current through resistor 92. The voltage drop set up by this current in the resistor is of such polarity that the excitation adjustment which produced it will tend to be retarded, such retardation resulting from a modification of the grid bias of vacuum tubes 51, 52 and 53. The magnitude of this modification furthermore, is directly dependent upon the rate of change of motor excitation adjustment which is an exceedingly desirable characteristic in any stabilizing system.

The explanation of operation just given relative to regulated motor 10 also applies to motor 12 which, as before stated, is provided with duplicate speed-control equipment, and to any additional motors which may be similarly controlled. By adjusting, through a change of setting of the speed-changing device 74, the relative rates at which the master generators are driven, comparable adjustments in the relative speeds at which the several motors will be maintained may be effected. Hence, without changing the speed of the master driving shaft 72, the speeds of the regulated machines may be varied relative to each other in any desired manner. When it is desired to raise or lower the speeds of all the regulated motors in a similar manner or in the same proportion, this may be done by appropriately varying the speed of master generator driving motor 70, which in the majority of applications of this type is accomplished by changing the voltage of the main power source 15.

It will be noted that in the system disclosed, a separate master generator is required for each of the regulated motors. This provision permits each of these motors to drive its pilot generator at a constantly related speed at all times and thus makes the provision of a speed-change mechanism intermediate the motor and pilot generator, which otherwise would be required, unnecessary. The more desirable disposition for such mechanisms is in association with the master generators as shown, since these generators together with their driving means may be located at a central or other common control point readily accessible to an operator or attendant.

For a similar reason, it is preferable to dispose the slip clutch device 76, which protects the two generators associated with each of the regulated motors from being pulled out of synchronism, intermediate the master generator and its driving means rather than between the regulated machine and its pilot generator. It will be understood, however, that if desired, the other location of the device can be utilized without detracting from the effectiveness thereof.

From the foregoing explanation of operation of the regulating system of our invention, it will be seen that the invention comprises means whereby each regulated motor will be caused to run at a speed which maintains the output voltage of its pilot generator in synchronism with the voltage of the alternating current master or speed setting generator associated with the motor. The regulation is, therefore, exceedingly precise. As before intimated, the rate of correction may be raised by increasing the speeds of the master and pilot generators.

In addition to the protection afforded during operation of the regulating system, the slip clutch device 76 fulfills a useful purpose during the period when the regulated motor is being started and brought up to the desired speed at which it drives the pilot generator at a rate synchronous with that of the master generator. To effect this starting operation, it is only necessary to connect the regulated motor with its sources of energizing and exciting power and bring it nearly up to speed before exciting both the master and pilot generators, the master generator being rotated at a rate corresponding to the desired motor speed.

The limited driving torque which slip-clutch device 76 will transmit to generator 62 prevents the two machines 62 and 60 from being pulled out of step, and the synchronizing current which the leading voltage of master machine 62 causes to flow in circuit 78 will effect, through the speed control-equipment already described, a reduction of motor excitation which will serve to increase the motor speed until it comes up to the value corresponding to the speed of master machine 62. When this value is reached, the master machine 62 will then be permitted to rotate at the same speed as its driving means and a slippage in device 76 will cease. From that point on, operation of the regulating system will proceed in the normal manner already described.

It will be understood, as before pointed out, that while adjustment of the motor speed is illustrated as being effected by adjusting the excitation, speed control may also be accomplished by adjusting the armature winding current of each regulated motor. Likewise, while current-controlling means for the motor winding have been shown in the form of electronic tubes of the grid controlled gas filled type, it will be understood that other rectifying devices capable of effective conductivity control may also be utilized, as for example, pool cathode rectifiers provided with make-alive elements which must be excited to institute conduction during each positive half cycle of anode voltage.

It will further be understood that our invention contemplates a broad application of the principle of utilizing the phase-displacement-produced current between an interconnected alternating-current pilot and a master voltage source to regulate the speed of a rotating machine, of which a direct current motor is but one example, and hence it is not restricted to any particular form of speed-adjusting means applied to the machine.

Although we have shown and described a certain specific embodiment of our invention, we are fully aware that many modifications thereof are possible. Our invention, therefore, is not to be restricted except insofar as is necessitated by the prior art and by the scope of the appended claims.

We claim as our invention:

1. A speed-regulating system for a rotating machine comprising, in combination, a source of alternating-current voltage having a speed-setting frequency, a pilot source of voltage having a frequency proportional to the machine speed, a circuit for interconnecting said two voltage sources in a manner that the current flow therein depends upon the phase displacement between the voltages, means, comprising an electronic tube, for adjusting the speed of the machine, and means for impressing upon said tube a control potential which varies with the direction and magnitude of the power-interchanging current flowing in the said circuit.

2. A speed regulating system for a plurality of motors comprising, in combination, a speed-adjusting means for each motor, a pilot alternating-current generator driven by each motor, a master alternating-current generator for each motor, a circuit for interconnecting said two generators associated with each motor, means responsive to the current in each of said circuits for controlling the speed-adjusting means of the associated motor, means for driving all of said master generators at definitely related speeds, and speed-changing devices disposed intermediate each of said generators and the said common driving means to adjust the speed relation among the said driven generators.

3. In a speed-regulating system for a direct-current motor, the combination of a pair of field windings for the motor, a resistor through which corresponding ends of the two windings are joined and a second resistor through which the remaining winding ends are connected, a source of power, a circuit for supplying to diagonally opposite points in said resistor-winding interconnection a current which energizes the windings to a degree corresponding to a low value of motor speed, a second source of power, a current adjusting device, a circuit including said device for supplying to the remaining diagonal points in said resistor-winding interconnection a current which opposes in the windings that supplied from the first source to reduce the motor excitation and thereby adjust the motor speeds, and means responsive to deviations from a desired value in the motor speed for controlling said device.

4. A speed-regulating system for a rotating machine comprising, in combination, a source of master alternating-current voltage, a source of pilot voltage having a frequency proportional to the machine speed, a circuit for interconnecting said two sources, speed-adjusting means for the machine comprising an electronic tube, and means responsive to the current flowing in said circuit for impressing upon said tube a control potential which varies with the phase displacement between the voltages of said two sources.

5. A speed-regulating system for a rotating machine comprising, in combination, a source of master alternating-current voltage, a source of pilot voltage having a frequency proportional to the machine speed, a circuit for interconnecting said two sources, speed-adjusting means for the machine comprising an electronic tube the impedance characteristics of which determine the machine speed, said tube having a grid element, and a transformer for impressing upon said tube grid element a control potential which varies with the current acting in said circuit.

6. In a speed-regulating system for a rotating machine, the combination of a master alternating-current generator for producing a voltage of speed-setting frequency, a pilot alternating-current generator driven by the motor, a circuit for interconnecting said two generators, speed-adjusting means for the machine comprising an electronic tube having anode and cathode elements and a control grid element, and a phase-shifting bridge circuit having an adjustable element in the form of a rectifier, an output circuit for said rectifier which includes the said two generators in parallel and the anode and cathode elements of the tube, and means for impressing upon the grid element of said tube an alternating-current control potential which varies with the current acting in said generator interconnecting circuit.

7. In a speed-regulatng system for a rotating machine, the combination of a master alternating-current generator for producing a voltage of speed-setting frequency, a pilot alternating-current generator driven by the motor, each of said generators having star-connected polyphase windings, a conductor for interconnecting the corresponding windings of said two generators, speed-adjusting means for the machine comprising a phase-shifting bridge circuit having an adjustable element in the form of a rectifier, an electronic tube for each of said generator phases, each of said tubes having a control element and a pair of major elements one of which is connected to the conductor which joins the generator windings of that phase, an output circuit for said rectifier which includes the other major element of all of said tubes and the neutral points of the windings of both of said generators, and means for impressing upon the control elements of each of said tubes an alternating-current potential which varies with the current acting in the winding interconnecting conductor with which each tube is associated.

8. In a speed regulating system for an electric motor having field and armature windings, said system comprising a source of master alternating-current voltage, a source of motor pilot voltage, a circuit for interconnecting said two sources, speed-adjusting means for the motor comprising an electronic tube disposed to control the current in one of the motor windings, and means responsive to the current in said interconnecting circuit for impressing a control potential upon said tube, the combination of anti-hunting means comprising a resistor disposed to modify said control potential in accordance with the voltage appearing across it, a capacitor, a circuit including said capacitor, and means for energizing said circuit by a voltage proportonal to the current acting in one of said motor windings.

STEPHEN A. STAEGE.
HENRY W. REDING.
JOHN F. PETERS.